(12) United States Patent
Brown

(10) Patent No.: US 6,173,284 B1
(45) Date of Patent: Jan. 9, 2001

(54) SYSTEMS, METHODS AND COMPUTER PROGRAM PRODUCTS FOR AUTOMATICALLY MONITORING POLICE RECORDS FOR A CRIME PROFILE

(75) Inventor: Mary Maureen Brown, Charlotte, NC (US)

(73) Assignee: University of Charlotte City of Charlotte, Charlotte, NC (US)

(*) Notice: Under 35 U.S.C. 154(b), the term of this patent shall be extended for 0 days.

(21) Appl. No.: 09/081,128

(22) Filed: May 19, 1998

Related U.S. Application Data

(60) Provisional application No. 60/047,305, filed on May 20, 1997.

(51) Int. Cl.[7] ............................................. G06F 17/30
(52) U.S. Cl. .................................. 707/10; 707/2; 707/3; 707/5; 707/101; 709/203; 709/216; 709/219
(58) Field of Search ............................... 707/10, 101, 3, 707/513, 2, 5; 709/203, 206, 219

(56) References Cited

U.S. PATENT DOCUMENTS

| | | | |
|---|---|---|---|
| 4,866,594 | 9/1989 | David et al. | 364/138 |
| 5,124,935 | 6/1992 | Wallner et al. | 364/525 |
| 5,283,644 | 2/1994 | Maeno | 348/152 |
| 5,319,560 | 6/1994 | Adams et al. | 364/439 |
| 5,444,615 | 8/1995 | Bennett et al. | 364/401 |
| 5,510,978 | 4/1996 | Colgan | 364/401 |
| 5,521,984 | 5/1996 | Denenberg et al. | 382/209 |
| 5,568,121 | 10/1996 | Lamensdorf | 340/539 |
| 5,584,025 | 12/1996 | Keithley et al. | 707/104 |
| 5,666,157 * | 9/1997 | Aviv | 348/152 |
| 5,724,261 | 3/1998 | Denny et al. | 364/550 |
| 5,861,810 * | 1/1999 | Nguyen | 340/534 |
| 5,918,214 * | 6/1999 | Perkowski | 705/27 |
| 5,974,309 * | 10/1999 | Foti | 455/412 |

* cited by examiner

Primary Examiner—Jean R. Homere
(74) Attorney, Agent, or Firm—Alston & Bird LLP

(57) ABSTRACT

Systems, methods and computer program products provide for monitoring information or police reports in a police database, including newly entered reports, for matches to predefined profiles. The predefined profiles are established by police officers, and may include one or more request terms (i.e., request data), a frequency term and notification information for the officer who defined the profile. The frequency term indicates how often the police database is searched for matches to the profile. The notification information is utilized to send notification to the police officer or group of officers that defined the profile when a match occurs.

21 Claims, 8 Drawing Sheets

FIRST ALERT
VEHICLE BY MODEL

FILL IN THIS FORM AND SELECT SUBMIT

| Field | |
|---|---|
| E-MAIL ADDRESS | ▭ —72 |
| PAGER ADDRESS | ▭ —74 |
| MODEL OF CAR | ▭ —76 |
| FREQUENCY | ▭ ↓ —78 |

NEW ENTRY
HOURLY
DAILY
WEEKLY

SUBMIT —80   RESET —82

RETURN TO PREVIOUS PAGE

FIG. 4.

SYSTEMS, METHODS AND COMPUTER PROGRAM PRODUCTS FOR AUTOMATICALLY MONITORING POLICE RECORDS FOR A CRIME PROFILE

CROSS REFERENCE TO RELATED APPLICATION

This application claims benefit of co-pending U.S. Provisional Application No. 60/047,305, entitled "Knowledge Based Community Oriented Policing System," filed May 20, 1997, the contents of which are incorporated herein in its entirety.

FIELD OF THE INVENTION

The present invention generally relates to law enforcement, and more particularly, to computer-based analysis of police records.

BACKGROUND OF THE INVENTION

For many police departments, the transition to community problem-oriented policing has transformed the way the police departments conduct business. The community policing paradigm emphasizes problem-solving as the basic unit of work. Police officers accomplish problem-solving goals by developing strong linkages with residents, for-profit firms, non-profit agencies, and corollary government units to provide a variety of services to the community. The foundation of these problem-solving partnerships is effective and timely communication between police and all segments of the community. As police departments become immersed in the problem-solving philosophy, the necessity for early problem identification becomes critical. Problem-solving can occur only after a particular crime or disorderly incident is recognized. Early recognition of potential problems is imperative to problem resolution. However, depending on the nature of the problem, it may take police and citizens a significant amount of time to recognize that several events are really a festering problem. Unfortunately, by the time that the recognition has occurred, the problem may well have reached a level where it takes extensive effort and time to reverse a critical situation which may literally have been years in the making. It is believed by many that if community policing is to succeed in making a lasting difference, and if police departments are to continue to rely on a problem-solving paradigm, that the dissemination of information and problem-solving activities must become more proactive so that crime and disorder can be addressed in its early stages.

For many agencies, early detection is the greatest obstacle to effective problem-solving activities. Generally, the earlier the potential problem is identified, the easier it is to alleviate. Once an entire neighborhood is consumed, the more difficult it is to eradicate the problem. For example, in an ideal case, police officers would recognize and take corrective actions after a third incident of house breaking instead of after receiving notification in a monthly report that fifteen incidences have occurred. Therefore, early pattern identification may help provide for increases in the probability of problem resolution through early intervention.

For many police departments, limited use of information as a strategic resource is one of the greatest impediments to early problem identification and remediation. Current information resources, such as computers and automated databases, often times do not have the needed capability to get the right information to the right people in a timely manner. Lack of adequate technology resources can thwart the methods of analyzing and addressing a problem before it threatens a citizen's safety or contributes to neighborhood disintegration. When there is technology such as database search engines that can provide officers with searchable information, the burden of searching the database on an ongoing basis for crime patterns currently falls on the police officer. In such cases, the police officers must routinely search through the databases to determine if specific events have occurred which could lead to a potential problem.

For example, U.S. Pat. No. 5,510,978 to Colgan describes a computerized community policing system which provides search capabilities that enable police officers to identify prior crime reports or other data that matches a desired crime profile. In general, the police officer can query a database to identify prior reports which include one or more key words identified by a police officer. However, the computerized police system described in the Colgan patent appears to require police officers to take the initiative to repeatedly query the database as to whether any newly added crime report matches the desired crime profile. Since police officers are already generally overburdened, it is unlikely that police officers will check the database on a frequent basis. As a result of the likely delay between the time that a crime report is entered into the database and the time that a police officer checks the database for the desired crime profile, the information contained by the crime report may become stale, and therefore, significantly less useful.

Thus, an unsatisfied need exists in the industry for a computer-based system for monitoring police records in a manner which reduces the burden upon police officers to repeatedly check the database while, at the same time, notifying one or more police officers of crime reports that match a desired crime profile in a timely fashion.

SUMMARY OF THE INVENTION

It is therefore an object of the present invention to provide an improved system for problem identification by police departments.

Another object of the present invention is to provide an improved system for monitoring police records.

Another object of the present invention is to provide an automated system that monitors police records on an ongoing basis for matches to predefined crime profiles.

Another object of the present invention is to provide a system for monitoring police records for predefined crime profiles and for notifying a police officer, or group of police officers, when a match for the profile occurs.

These and other objects of the present invention are provided by systems, methods and computer program products that provide for automatically monitoring information or police reports in a police database, including newly entered reports, for matches to predefined crime profiles. The predefined crime profiles are established by police officers, and may include one or more request terms (i.e., request data), a frequency term, and notification information for the officer who defined the crime profile. The frequency term indicates how often the police database is searched for matches to the crime profile. The notification information can be utilized to automatically send notification to the police office, or group of police officers, that defined the crime profile when a match occurs.

In accordance with an aspect of the present invention, a law enforcement data analysis system for automatically monitoring police records for a crime profile may comprise a user interface module that receives user inputted query information defining a search query for searching for the crime profile, and a server module which receives the user inputted query information from the user interface module and transforms the user inputted query information into a database procedure. A database module executes the procedure against a police record database, and generates a notification signal if a match to the search query occurs. A notification module receives the notification signal, and generates a notification message to a user in response to the notification signal.

The user interface module may comprise a hypertext markup language (HTML) document configured to receive the user inputted query information through an Internet browser program. In a preferred embodiment, the HTML document comprises dynamic HTML.

The user inputted query information comprises request data, a frequency term, and notification data. The request data may define at least one element of the crime profile, and the frequency term indicates a frequency at which the procedure is executed by the database module. For example, the user may be able to select a frequency term such as real-time, hourly, daily, or weekly. The notification data may comprise an electronic mail address and/or a pager number for notifying the user, or a designated group of users, if and when a record is entered in the database as detected via the execution of the procedure.

In accordance with a feature of the present invention, the server module may generate a structured query language (SQL) statement based on the user inputted query information. The server module may then generate a procedure based upon the SQL statement. In order to minimize the overhead associated with searching the police record database, the police record database may comprise a data replica of a larger police record database.

In accordance with another aspect of the present invention, a computer program product for use with a data processing system for automatically monitoring police records for a crime profile may comprise computer-readable code means embodied in a computer usable medium, wherein the computer-readable code means comprise a user interface module that receives user inputted query information defining a search query for searching for the crime profile, and a server module which receives the user inputted query information from the user interface module and transforms the user inputted query information into a database procedure. A database module may execute the procedure against a police record database, and may generate a notification signal if a match to the search query occurs. Further, a notification module may receive the notification signal, and may generate a notification message to a user in response to the notification signal.

The server module may generate a database procedure based on the user inputted query information. Further, the user interface module may receive user inputted query information that includes a frequency term for indicating the frequency at which the procedure is executed by the server module.

In accordance with yet another aspect of the present invention, a law enforcement data analysis method for automatically monitoring police records for a crime profile may comprise the steps of receiving user input query information defining a search query for the crime profile, transforming the user input query information into a database procedure, executing the database procedure against a police record database; and if a match to the search query occurs in the step of executing the database procedure, then generating a notification message to the user or a group of users.

The step of transforming the user inputted query information may include the step of generating a database procedure based on the user inputted query information. Further, the step of executing the database procedure may be performed at a user-defined frequency.

Therefore, the system, method and computer program product of the present invention automatically monitor a police database at a user-defined frequency to identify a user-desired crime profile. As such, a police officer will be automatically notified of all crime reports, including newly added crime reports, which match the desired crime profile without having to take the initiative and the time to repeatedly query the police database. By automatically searching the police database and automatically notifying the police officer of all matches, the system, method and computer program product of the present invention should provide community police officers with timely information that can be utilized to solve ongoing crimes.

Other features and advantages of the present venture will become apparent to one that is skilled in the art upon examination of the following drawings and detailed description. It is intended that all such additional features and advantages be included herein within the scope of the present invention, as defined in the appended claims.

BRIEF DESCRIPTION OF THE DRAWINGS

FIGS. 4–7 are block diagrams illustrating the architecture and functionality of an end user, a web server, a database server, and an e-mail server, respectively, in accordance with an embodiment of the present invention.

DETAILED DESCRIPTION OF THE PREFERRED EMBODIMENTS

Figure 1:
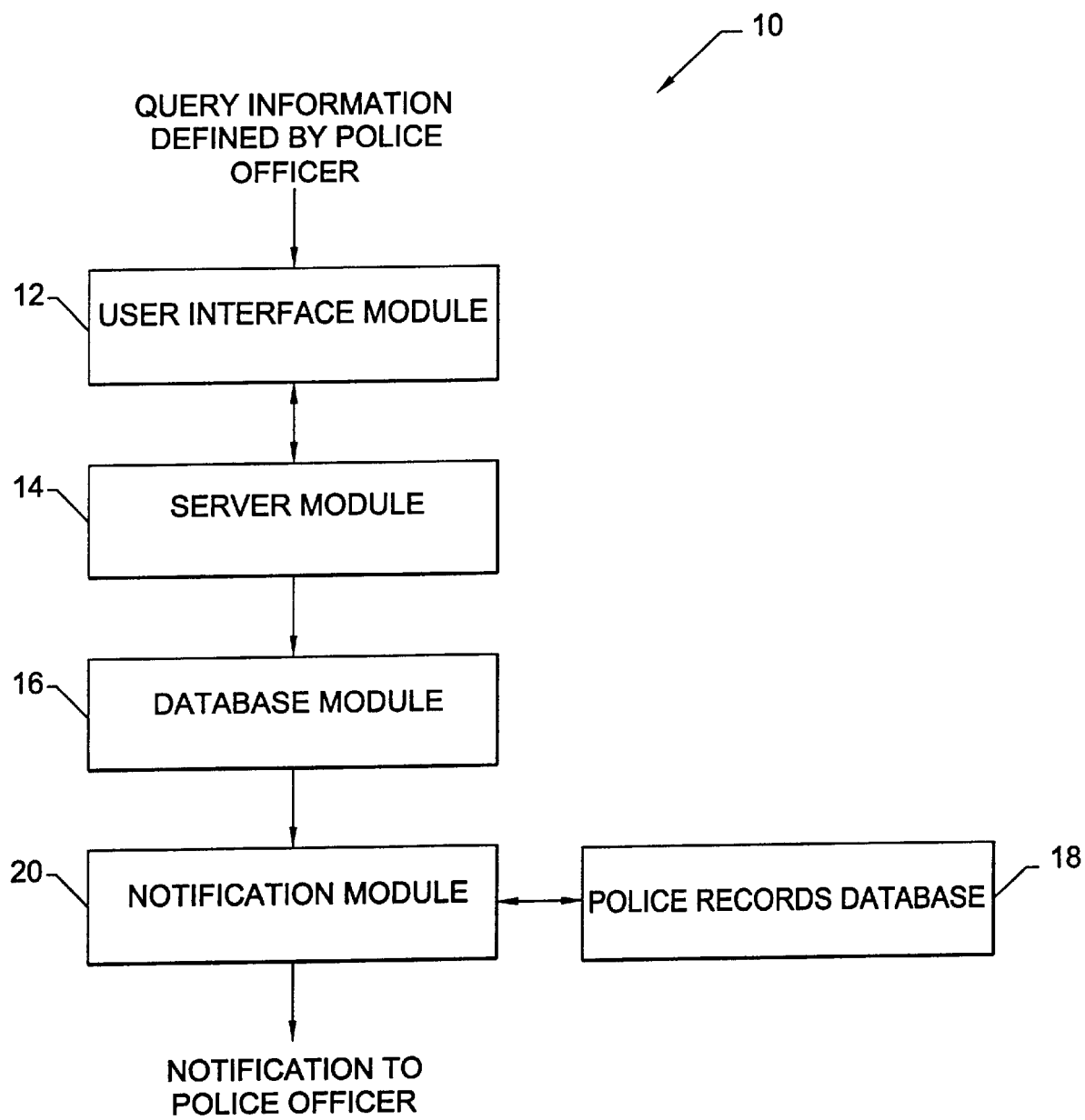
FIG. 1 is a high level block diagram of an embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of ordinary skill in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. Any suitable computer readable storage medium may be utilized including hard disks, CD-ROMs, optical storage devices, or magnetic storage devices.

The present invention is described below with reference to block diagrams and flowchart illustrations of methods, apparatus (i.e., systems) and computer program products according to an embodiment of the invention. It will be understood that each block of the block diagrams and the flowchart illustrations, and combinations of blocks in the block diagrams and combinations of the blocks in the flowchart illustrations, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks of the flowchart, or block or blocks of the diagrams.

Accordingly, blocks of the block diagrams and the flowchart illustrations support combinations of means for performing the specified functions, combinations of steps for performing the specified functions and program instruction means for performing the specified functions. It will also be understood that each block of the block diagrams and the flowchart illustrations, and combinations of the respective blocks, can be implemented by special purpose hardware-based computer systems which perform the specified functions or steps, or combinations of special purpose hardware and computer instructions.

With reference to FIG. 1, a law enforcement data analysis system 10 for automatically monitoring police records for a crime profile is illustrated. The system 10 comprises a user interface module 12 that receives query information from a police officer that defines a search query for a crime profile. A server module 14 receives the query information from the user interface module 12 and transforms the query information into a database procedure. The database module 16 receives the database procedure from the server module and executes the procedure against a police record database 18 on a periodic basis defined by the police officer in the query information. If a match occurs, the database module generates a notification signal. A notification module 20 receives the notification signal from the database module, and generates a notification message to the police officer, or a group of police officers, in response to the notification signal. The notification message may, for example, be in the form of electronic mail (e-mail) or a page.

Accordingly, the system 10 is able to shift the burden of identification of crime-related problems from the police officer to a computer-based system. The police officer is relieved of the task of having to repeatedly search the police records database for new events that match a certain crime profile. Thus, as opposed to current systems which require the police officer to repeatedly search the police records database in order to determine if newly entered records match a crime profile, the present invention performs such tasks for the officer, thereby allowing the officer to perform other tasks. Moreover, crime-related problems may be detected earlier, which may facilitate a more rapid response and/or intervention which may result in faster and less costly resolution.

Figure 2:
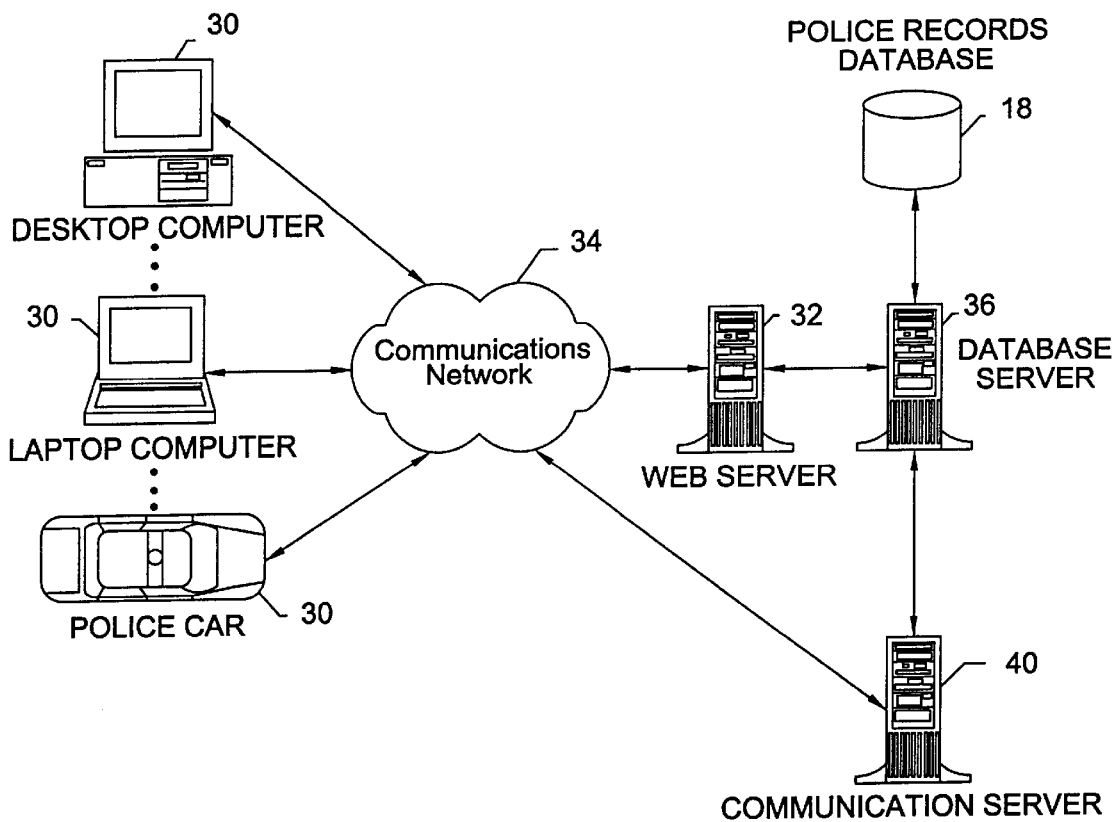
FIG. 2 is a schematic diagram of exemplary system hardware components implementing an embodiment of the present invention.

With reference to FIG. 2, an exemplary configuration of hardware components which are suitable for implementing the system 10 is illustrated. In general, the user interface module 12 can be implemented via a user interface device 30 which receives query information from a police officer that defines a search query directed to a crime profile. The user inputted query information can be sent to the server module 14, which can be implemented via a web server 32, by way of a communications network 34. At the web server 32, the server module 14 transforms the user inputted query information into a procedure which is passed along to the database module 18 which can be implemented via a database server 36. The database server 36 executes the procedure against the police records database 18. If a match occurs during execution of the procedure, then the database module 16 generates a notification signal which is passed on to the notification module 20 which can be implemented via a communication server 40. The communication server 40 generates the appropriate notification message which is sent to the police officer, or a group of police officers. The notification sent to the police officer may take any of a number of different forms such as an e-mail or a page, either of which may be delivered over the communication network 34 to the user, or group of users. The following discussion will describe in further detail the operation and functionality of the various hardware components illustrated in FIG. 2 which implement one advantageous embodiment of the law enforcement data analysis system 10.

The user interface device 30 is a client side device provided to execute the user interface module 12 which, in a preferred embodiment, comprises a web page form (hereafter referred to as a query information form) displayed through an Internet browser program. The query information form may comprise any suitable formatting such as DHTML, HTML, Java, ActiveX, etc. Accordingly, the user interface device 30 may take the form of a desktop computer, laptop computer, handheld computer, personal digital assistant, cellular phone, or any other device capable of running a Internet browser program and establishing a communication link over a network.

Figure 3:
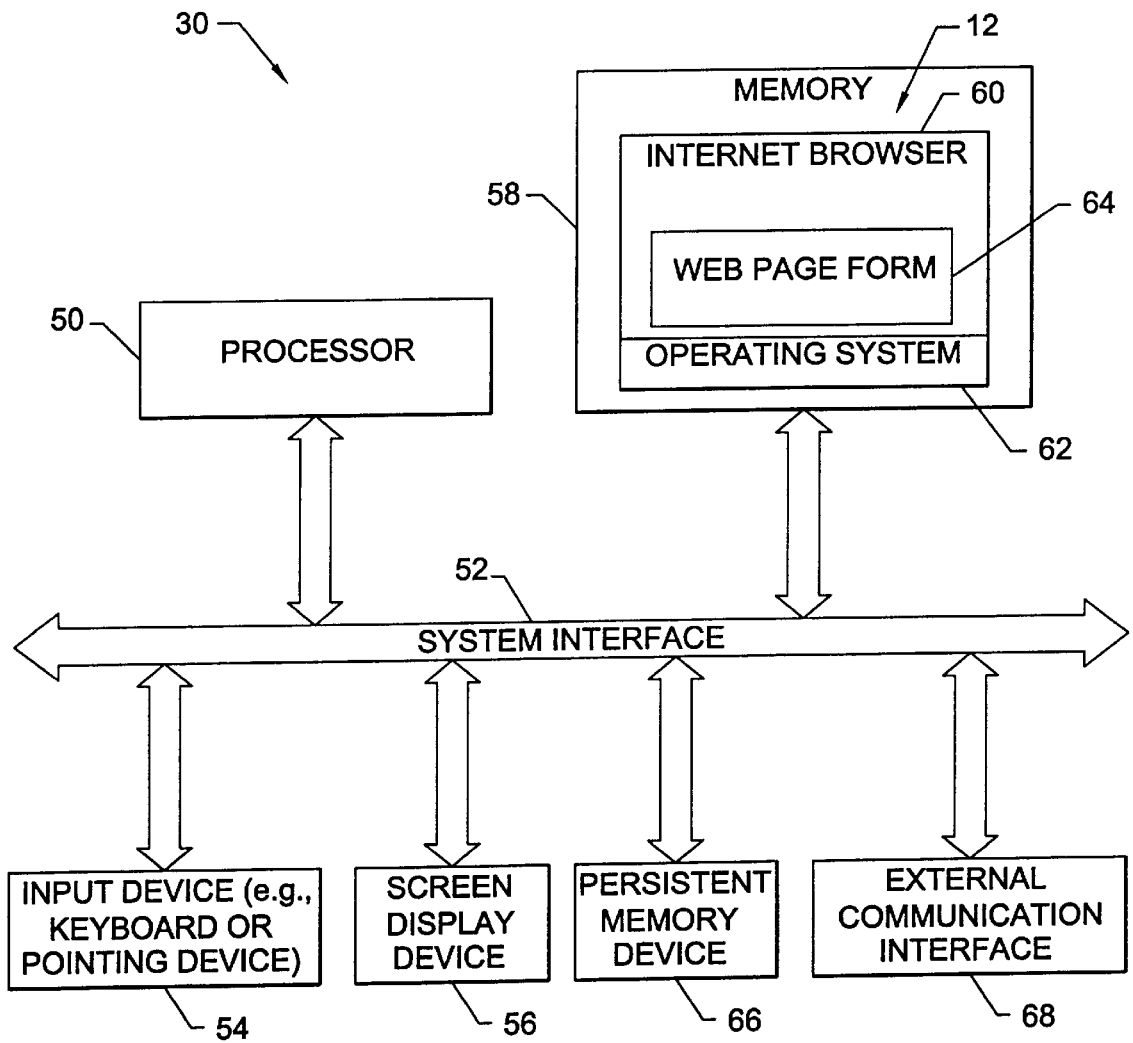
FIG. 3 is an example of a screen display of a police query information form in accordance with the present invention.

As illustrated in FIG. 3, a user interface device 30 preferably includes a processor 50 that communicates with other elements within the user interface device 30 via a system interface 52. An input device 54, for example, a keyboard/key pad or a pointing device (including a touch stylist), is used to input data from a user, and a screen display device 56, for example, a monitor or liquid crystal display, is used to output data to the user. A memory 58 within the user interface device 30 includes an Internet browser program 60 and a conventional operating system 62 which communicates with the Internet browser program 60 for execution of the query information form 64 by processor 50. Thus, the Internet browser program 60 and query information form 64 comprise the user interface module 12. It is noted that the Internet browser program 60 should be capable of supporting HTML 1.0. It is further noted that the query information 64 is downloaded from the web server 32 for execution during a single session of the Internet browser program 60, and is not necessarily persistently stored by the user interface device 30. A persistent memory device 66 may be provided for providing persistent memory to the user interface device 30, and an external communication interface 68 may be provided for interfacing the user interface device 30 with the communication network 34. As an example, the external communication interface 68 may be implemented by a land-line or cellular modem, or a network interface card.

Accordingly, a user such as a police officer who is interested in monitoring a potential problem can launch the Internet browser program 60 on the user interface device 30. The police officer then navigates to a front-end web page by typing a particular uniform resource locator (URL) address in an address field of the Internet browser program 60. The police officer may initially be presented with a log-on web page where the police officer is queried for a username and password for verification and security reasons before given access to the query information form 64. In this configuration, where the police officer can gain access to the query information form 64 from any user interface device 30, the police officer essentially has a virtual terminal. Thus, the police officer can log into the system 10 through any user interface device 30, which is often advantageous in a police department organization. Once the officer has provided the proper username and password, the police officer is presented with the query information form 64 via screen display device 56. As mentioned above, the query information form 64 is downloaded to the user interface device 30 from the web server 32, and more particularly, from the server module 14. An example of a query information form 64 in accordance with the present invention is illustrated in FIG. 4.

The query information form 64 comprises dialog boxes in which the user may enter information such as request data which defines the crime profile which the user wishes to monitor, a frequency term which defines the frequency at which a search is performed against a police records database, and notification data such as an e-mail address or pager address for single or group notification if a match occurs with the pre-specified crime profile. Specifically, the query information form 64 provide dialog boxes 72, 74 in which the user may enter an e-mail address and/or pager address, respectively, which will be used to notify the police officer (or police officers) if a match occurs. If multiple parties are to be notified, as may be desirable, an alias e-mail address for an e-mail group may be entered in dialog box 72.

In a dialog box 76, the user may enter request data, which for purposes of exemplary query information form 64, is the model of car that the user wishes to search. However, it is noted that the request data may take virtually any form suited for identifying a problem or crime such as a type of activity, date of activity, location of activity, type of victim, type of perpetrator, type of weapon, or any other information available to the police in order to more specifically tailor the search query. In addition, the request data may include a frequency term that defines a number of occurrences of a data item such as an event/activity, name or instrumentality before a match is triggered. The present invention may also provide for multiple request data fields in a single query information form 64, and for multiple terms within each request data field, as is commonly done with search request queries. Further, the present invention may provide the ability to generate notifications based on crime frequency or crime counts, for example the number of burglaries that occur over a given time frame or within a given area.

The user may select a frequency term from a dropdown menu 78, which provides pre-selected frequency term options such as new entries, hourly, daily, or weekly. The user may submit or reset the form 64 by selecting one of buttons 80, 82, respectively. The ability to select a frequency at which the requested search will be executed is particularly advantageous because this frees the police officer from repetitively conducting the same searches time and time again. The frequency term allows the police officer to submit one search request which will be conducted via the server side logic on the database server 36 on a routine basis in accordance with the frequency term designated by the user, that is, on each new entry (i.e., each new police record entry or update), hourly, daily, or weekly, etc. It is noted that the option to search on each new entry provides essentially real-time search capabilities on an ongoing basis after the search request has been submitted once by the police officer. Though not provided for in query information form 64, it is within the scope of the present invention to also provide a expiration term at which time the search ceases to be performed. The expiration term may be set to a default value if not a user defined term.

Once a user has populated the dialog boxes and dropdown menus of query information form 64, the user may submit the form by selecting button 80, or reset the form by select button 82. By submitting the query information form 64, the information entered by the user is sent to the web server 32 via HTML and hypertext transfer protocol (HTPP) commands, as is well known in the industry. The data exchanged between the user interface device 30 and web server 32 passes through the communications network 34.

The communications network 34 may be a local area network (LAN), public switch telephone network (PSTN), satellite uplink/downlink network, cellular network, or any other suitable network configuration which supports HTTP. Since the number of bytes of data exchanged between the browser program 60 and the web server 32 is relatively small, the bandwidth of the network should not pose a significant issue with regard to system performance. In an embodiment of the present invention, the communications network 34 comprises a cellular digital packet data (CDPD) network. Further, it is noted that the communications network 34 may be configured as the Internet or a private extranet, as may be desired. Further, it is preferred that redundancy be provided in communication network 34 in case of a service interruption.

The user inputted query information entered in the query information form 64 is received by the web server 32 where it is processed by, among other software modules, the server module 14, as described below. In addition, a confirmation copy of the query information received by web server 32 is preferably sent back to the user for verification.

Figure 5:
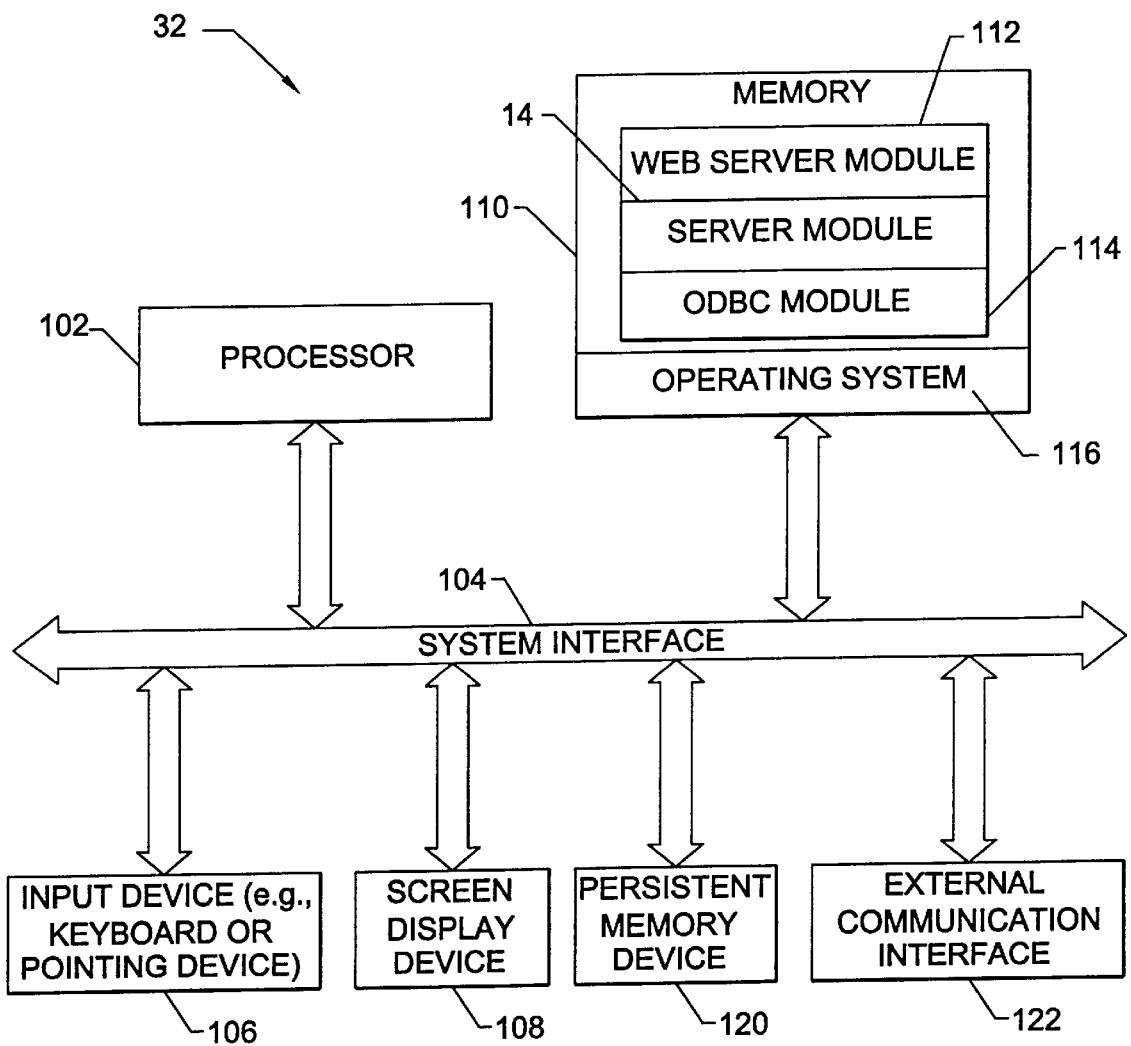

With reference to FIG. 5, the web server 32 includes a processor 102 that communicates with other elements within the web server 32 via a system interface 104. An input device 106, for example, a keyboard or pointing device, is used to input data from a user, and a screen display device 108, for example, a monitor, is used to output data to the user. A memory 110 within the web server 32 includes a web server program 112, the server module 14, and an open database connectivity (ODBC) module 114, all of which communicate with a conventional operating system 116 for execution via processor 102. A persistent memory device 120 may provide persistent memory to web server 32, and an external communication interface 122 interfaces web server 32 with at least the communication network 34 and the database server 36.

The web server module 112 interfaces the server module 14 with the browser program 60 that is running on the user interface device 30. In essence, the web server module 112 passes the appropriate HTTP requests from the browser program 60 to the server module 14 for processing. For example, such a request may be for the query information form 64. The server module 14 then generates a web page comprising the query information form 64, which the web server module 112 then takes from the server module 14 and delivers to the browser program 60. Suitable web server modules are available from Netscape Communications Company (http://www.netscape.com) or Microsoft Corporation (http://www.microsoft.com).

The server module 14 is a middleware application that not only generates web pages that are requested by the browser program 60, but also receives the user inputted query information from the query information form 64, and generates database procedures for execution by the database module 16. Examples of commercially available middleware application suitable for implementing as server module 14 include WebObjects by Apple Computer Inc. (http://www.apple.com), Active Server Pages (ASP) by Microsoft Corporation (http://www.microsoft.com), or Cold Fusion by Allaire Corporation (http://www.coldfusion.com).

In a preferred embodiment, the server module 14 is implemented by WebObjects application, which receives the user input query information from the browser program 60 via the query information form 64. The server module 14 extracts the user entered values from the query information form 64, and generates a database statement, which is essentially a database query formed from the requested data inputted by the police officer. A database procedure is then generated based on the statement. The database procedure is a command to be executed by the database module 16, and includes the statement and other information provided by the police officer such as the frequency term and notification data. The database procedure is passed onto the database module 16 via the ODBC module which interfaces the server module 14 with the database module 16. The ODBC module formats the database procedure for the specific type of database implementing the database module 16. Thus, the server module 14 can interface with virtually any database that conforms to ODBC protocol, such as SQL, Oracle, etc. Accordingly, the ODBC module formats the database procedure and then sends the database procedure to the database server 36 for processing. It is noted the database procedure passed on to the database server 32 includes values for the requested data, frequency of execution, and notification of the police officer if a match occurs.

The database server 32 includes the database module 16 which executes the database procedure in accordance with the present invention. In a preferred embodiment, the database module is an SQL database.

Figure 6:
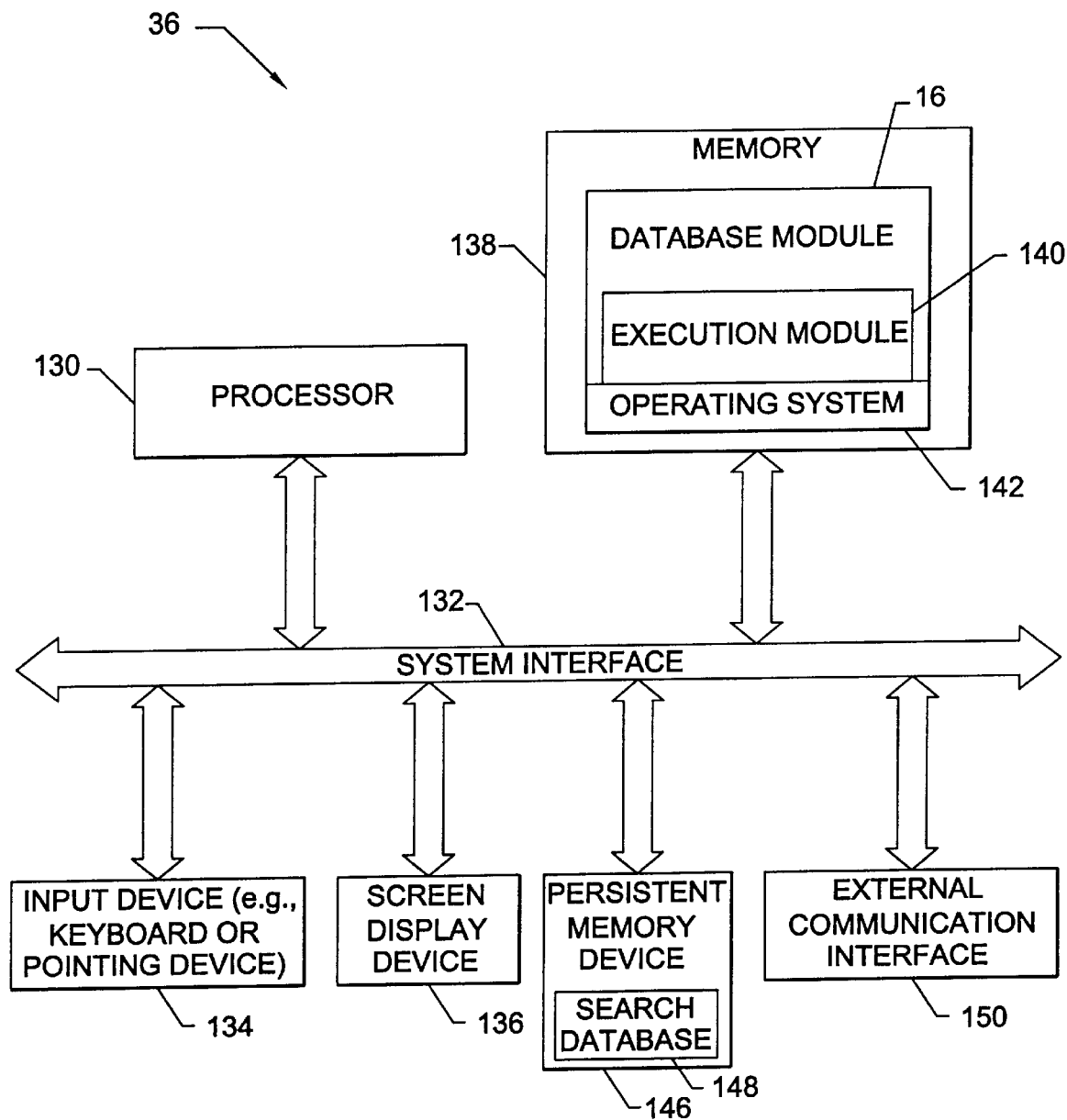

With reference to FIG. 6, the database server 36 preferably includes a processor 130 that communicates with other elements within the database server 36 via a system interface 132. An input device 134, for example, a keyboard or pointing device, is used to input data from a user, and a screen display device 136, for example, a monitor, is used to output data to the user. A memory 138 within the database server 36 includes the database module 16 which includes an execution module 140. The database module 16, including the execution module 140, is in communication with a conventional operating system 142. The operating system 142 communicates with processor 134 to execute the database module 16, including the execution module 140. In addition, a persistent memory device 146 provides persistent memory for the database server 32. The persistent memory device 146 includes a search database 148, which is preferably a subset or replica of the police records database 18, as discussed in detail below. An external communication interface 150 interfaces the database server 36 with one or more of the web server 32 and communications server 40.

In a preferred embodiment, the database module 16 is implemented by an SQL database which includes an SQL executive that functions as the execution module 140. The database module 16 is what is commonly referred to as the database engine. However, it will be recognized by those skilled in the art that the database module 16 could be implemented by other suitable relational database applications such as Oracle.

As previously stated, the database procedure is received by the database module 16 of the database server 32. The procedure is stored in a system task table of the database module 16. The query defined by the procedure is associated with an alert or trigger which is monitored by the execution module 140. In particular, the execution module 140 monitors each alert for their next run time, as defined by the procedure. If no frequency term is provided by the police officer in the query information form 64, then a default term may be set, such as every hour. When an alert is determined to be ready for execution, the execution module 140 reads the command associated with the corresponding procedure, which is the query embedded in the procedure. The execution module 140 then executes the command on the search database 148.

The search database is preferably a subset of the police records database 18. This configuration reduces the memory and processing overhead of executing the procedures on the complete police records database 18. In particular, the data populating the search database is a data replica of certain fields taken from the production database comprising the police records database. Further, in an effort to improve performance, an automatic expiration date may be attached to each procedure if one is not set when the request was submitted. The data replication can be done through a bulk copy program (BCP) or a pull methodology. Pull replication will require the search database 148 to periodically connect to the police records database and compare data. If there is a discrepancy in the data, the search database 148 is updated. Conversely, a transaction service may be employed where every time a new police record is entered in the police records database 18, the police records database may automatically update the search database 148. This will ensure that the procedures are executed against current data.

The statement embedded in the procedure and executed by the execution module 140 is constructed by the server module 14 as a IF EXIST, THEN query command. Thus, the statement provides for a return on the query, which if found true when executed against the search database 148, generates a notification message that is sent to the identification module 20 implemented via communication server 40. If there is no return on the query, then the statement is not true and the query terminates. In essence, the execution module 140 searches the search database 148 for a match to the crime profile defined by the query. If no match is found, the execution module 140 goes on to the next procedure to be executed based on the alerts, and will re-execute the present procedure upon the next completion of a frequency cycle, i.e., upon receiving the next alert for the present procedure.

The notification message may include information from the police record that matched the search query so that the police officer is provided with substantive information in the notification message. Further, the notification message may include a search ID or record number so that the police office can log into the system 10 for more information regarding the search results.

The communication server 40 receives the notification message from the database module 16 and the notification module 20 sends the appropriate message to the police officer indicating that there was a match to the submitted query. Though the notification module 20 is shown implemented on a separate communication server 40, it will be appreciated by those skilled in the art that the notification module 20 could have been implemented on the database server 36 or web server 32, if desired.

Figure 7:
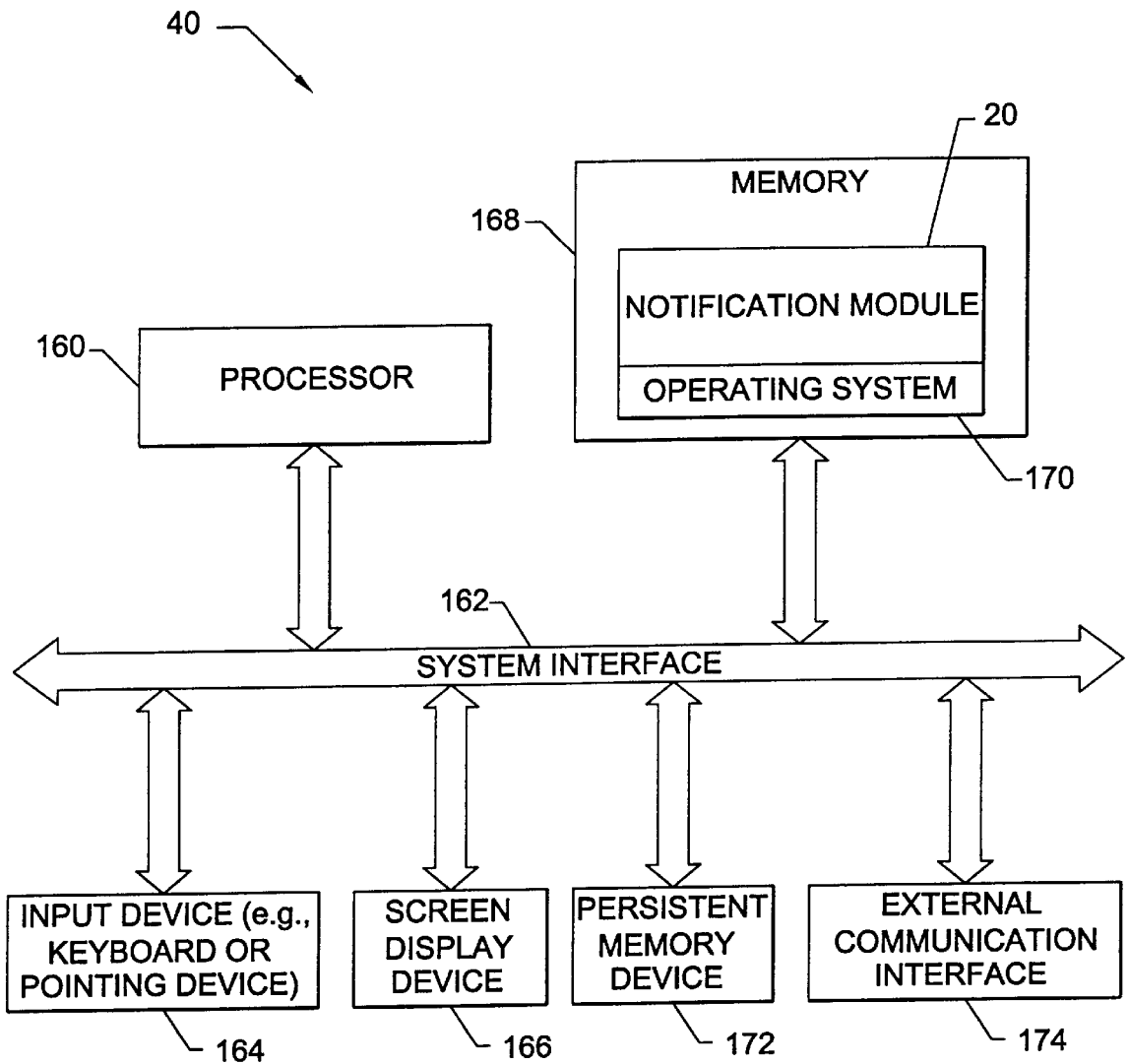

With reference to FIG. 7, the communication server 40 preferably includes a processor 160 that communicates with the other elements within the communication server 40 via a system interface 162. An inputted device 164, for example, a keyboard or pointing device, is used to input data from a user, in a screen display device 166, for example, a monitor, is used to output data to the user. A memory 168 within the communication server 40 includes a notification module 20 that is in communication with a conventional operating system 170. The operating system 170 communicates with the processor 160 for execution of the notification module 20. In a preferred embodiment, the notification module 20 is implemented as Microsoft Exchange Mail application from Microsoft Corporation (http://www.microsoft.com), wherein database module 16 has a user mailbox for message delivery. The communication server 40 further includes a persistent memory device 172 for persistent memory, and an external communication interface 174 for interfacing the communications server 40 with at least the database server 36 and the communications network 34.

Accordingly, the communication server 40 receives a notification message from the database server 36 indicating that there was a match during the execution of a database procedure by database module 16. As mentioned above, the notification message from the database server 36 may include police record data which is to be sent to the police officer who originally submitted the query. The notification module 20 determines what the appropriate delivery mechanism is for the notification is based upon that designated in the query information form 64 completed by the police officer. This information is passed through the system 10 and is included in the notification message. The notification module then passes the notification message onto the appropriate connector of the notification module 20, for example, Internet mail connector or a paging connector, or both. The connector then generates the message and sends the message to the police officer or group of police officers.

Accordingly, a police officer can submit one search query and the system 10 will notify the police officer when there is a match to that query in the future. If the frequency term is set for each new database entry (i.e., every time a new record is entered into the police database, and thus, the search database), then the police officer may be given essentially real-time notification that an event has recently occurred that matches the search she previously submitted before the event record was entered into the police database.

Figure 8:
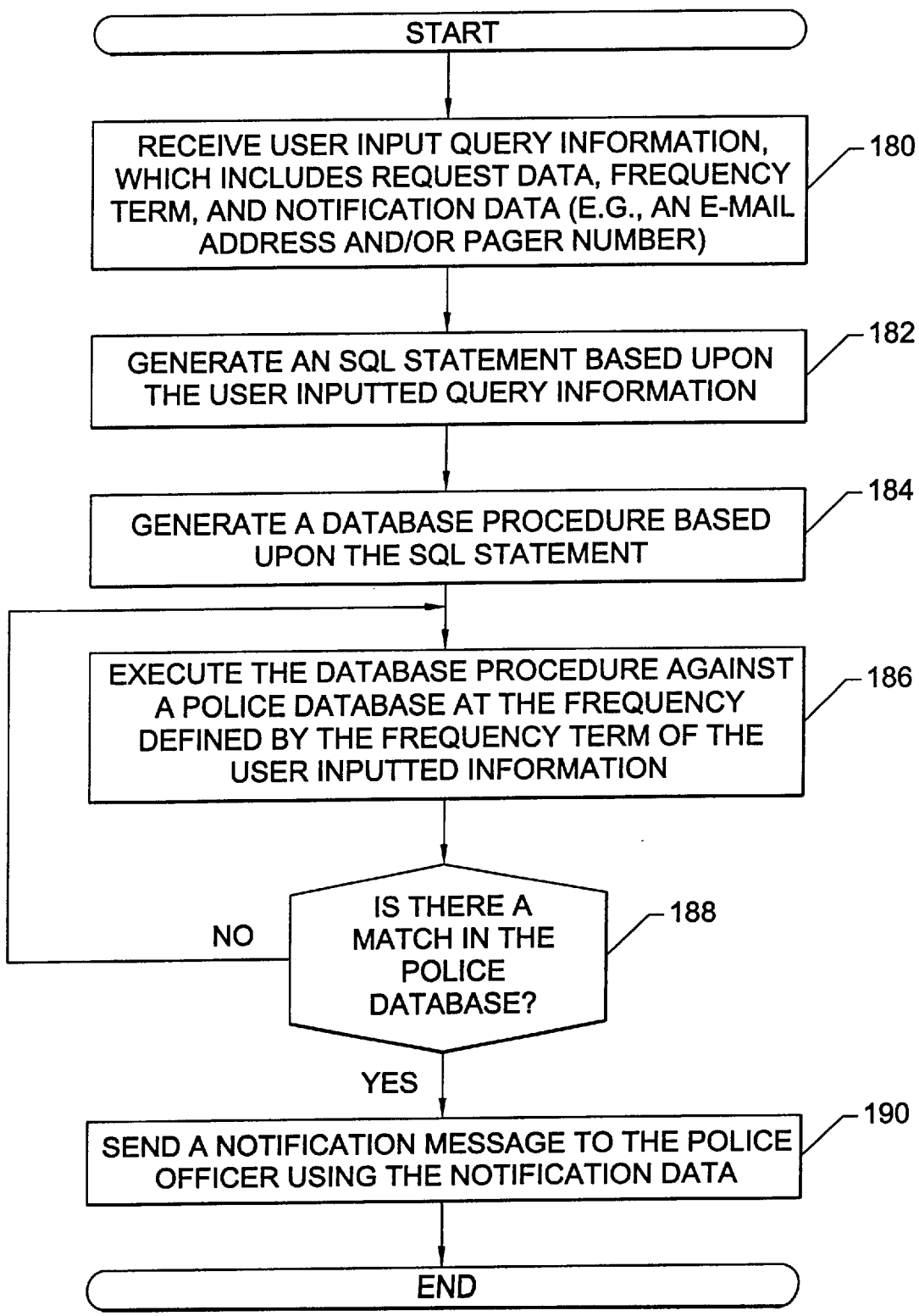
FIG. 8 is a flowchart of the operation of the system, method and computer program product in accordance with an embodiment of the present invention.

With reference to FIG. 8, a flowchart is provided which illustrates the operation sequence of events of an embodiment of the present invention. Initially, at block 180, user input query information is received. User input query information may include request data, a frequency term, and notification data (e.g., an e-mail address and/or page number). A statement is then generated based upon the user inputted query information, as indicated by block 182. From the statement, a database procedure is generated, as indicated by block 184. The database procedure is then executed against a police records database at the frequency defined by the frequency term of the user inputted query information, as indicated by block 186. It is then determined whether there is a match in the police records database, as indicated by block 188. If there is no match, the procedure will continue to execute at the frequency defined until a match occurs or the query expires. If there is a match in the police records database, then a notification message is sent to the police officer, as indicated by block 190.

Therefore, the system, method and computer program product of the present invention automatically monitor a police database at a user-defined frequency to identify a user-desired crime profile. As such, a police officer will be automatically notified of all crime reports, including newly added crime reports, which match the desired crime profile without having to take the initiative and the time to repeatedly query the police database. By automatically searching the police database and automatically notifying the police officer of all matches, the system, method and computer program product of the present invention should provide community police officers with timely information that can be utilized to solve ongoing crimes.

It is noted that the present invention may be implemented as a part of a larger system which provides for additional functionality through various software modules, such as a reporting module, crime specific tutorials, or crime specific prevention information. The reporting module may capture primary reports generated by police officers such as offense reports, field interview reports, or case investigation reports. The crime specific tutorials may provide information about a number of specific crimes and the relevant information to be collected in order to document each of the specified crimes. As such, a police officer may be prompted during the investigation at a crime scene to collect the evidence that will later be used by the district attorney's office to substantiate the specific crime. Lastly, the crime specific prevention information provides information for victims on suggested steps to take in order to prevent various types of crime.

Further, while the implementation of the present invention described above is in the context of monitoring police records, it will be recognized the principles of the present invention are equally advantageous and applicable to other settings. For example, the present invention may be configured to interface with an internal affairs database, property and evidence tracking databases, field interview record databases, arrest database, warrant database, parole and probation database, personnel database, training database and dispatch record databases.

In the drawings specification, there have been disclosed typical embodiments of the invention and, although specific terms are employed, they are used in a generic and descriptive sense only and not for purposes of limitation, the scope of the invention being set forth in the following claims.

Wherefore, the following is claimed:

1. A law enforcement data analysis system for automatically monitoring police records for a crime profile, comprising;

a user interface module that receives user inputted query information defining a search query for searching for said crime profile;

a server module which receives said user inputted query information from said user interface module and transforms said user inputted query information into a database procedure, and wherein the user inputted query information comprises notification data defining a means of notification;

a database module which executes said procedure against a police record database, and generates a notification signal if a match to said search query occurs; and a notification module that receives said notification signal, and generates a notification message to a user in response to said notification signal according to said means of notification.

2. The law enforcement data analysis system of claim 1, wherein said user interface module comprises an web page form configured to receive said user inputted query information through an Internet browser program.

3. The law enforcement data analysis system of claim 2, wherein said web page form comprises dynamic HTML.

4. The law enforcement data analysis system of claim 1, wherein said user interface module receives user inputted query information that comprises request data and frequency term data.

5. The law enforcement data analysis system of claim 1, wherein said notification data comprises at least one selected from the group consisting of an electronic mail address and a pager number.

6. The law enforcement data analysis system of claim 4, wherein said frequency term indicates a frequency at which said procedure is executed by said database module.

7. The law enforcement data analysis system of claim 4, wherein said request data defines at least one element of said event.

8. The law enforcement data analysis system of claim 1, wherein said server module generates a statement based on said user inputted query information.

9. The law enforcement data analysis system of claim 8, wherein said server module generates said procedure based upon said statement.

10. The law enforcement data analysis system of claim 1, wherein said police record database is a data replica of a second police record database.

11. The system of claim 1, wherein said user inputted query information includes notification information, and wherein said notification module generates a notification signal that includes said notification information.

12. The law enforcement data analysis system of claim 1, wherein said user interface module receives user inputted query information that includes a frequency term for indicating the frequency at which said procedure is executed by said server module.

13. The law enforcement data analysis system of claim 12, wherein said frequency term is one selected from the group consisting of each new entry, hourly, daily, and weekly.

14. The law enforcement data analysis system of claim 12, wherein said server module executes said procedure when said police record database is updated.

15. A computer program product for use with a data processing system for automatically monitoring police records for a crime profile, said computer program product comprising:

a computer usable medium having computer-readable code means embodied in said medium, said computer-readable code means comprising:

a user interface module that receives user inputted query information from said user interface module and transforms said user inputted query information into a database procedure and wherein the user inputted query information comprises notification data defining a means of notification;

a database module which executes said procedure against a police record database, and generates a notification signal if a match to the search query occurs; and a notification module that receives said notification signal, and generates a notification message to a user in response to said notification signal according to said means of notification.

16. The computer program product of claim 15, wherein said server module generates a database procedure based on said user inputted query information.

17. The computer program product of claim 15, wherein said user interface module receives user inputted query information that includes a frequency term for indicating the frequency at which said procedure is executed by said server module.

18. A law enforcement data analysis method for automatically monitoring police records for a crime profile, comprising the steps of:

receiving user input query information from a user defining a search query for the crime profile, wherein the user input query information comprises notification data defining a means of notification;

transforming the user input query information into a database procedure;

executing the database procedure against a police record database; and if a match to said search query occurs in said step of executing the database procedure, then generating a notification message to the user according to said means of notification.

19. The law enforcement data analysis method of claim 18, wherein said step of transforming the user inputted query information includes the step of generates a database procedure based on the user inputted query information.

20. The law enforcement data analysis method of claim 18, wherein said step of executing the database procedure is performed at a user defined frequency.

21. A law enforcement data analysis system for automatically monitoring police records for a crime profile, comprising;

a user interface module that receives user inputted query information defining a search query for searching for said crime profile;

a server module which receives said user inputted query information from said user interface module and transforms said user inputted query information into a database procedure, and wherein the user inputted query information comprises a frequency term;

a database module which executes said procedure against a police record database, and generates a notification signal if a match to said search query occurs, wherein the frequency at which said procedure is executed by said database module is defined by said frequency term; and a notification module that receives said notification signal, and generates a notification message to a user in response to said notification signal.

* * * * *

UNITED STATES PATENT AND TRADEMARK OFFICE
CERTIFICATE OF CORRECTION

PATENT NO.  : 6,173,284 B1
DATED       : January 9, 2001
INVENTOR(S) : Brown

Page 1 of 1

It is certified that error appears in the above-identified patent and that said Letters Patent is hereby corrected as shown below:

<u>Title page,</u>
Item [73], Assignee, "University of Charlotte City of Charlotte" should read
-- University of North Carolina at Charlotte and the city of Charlotte --.

Signed and Sealed this

Eighth Day of January, 2002

*Attest:*

JAMES E. ROGAN
*Attesting Officer*    *Director of the United States Patent and Trademark Office*